March 1, 1966 A. ZIEGLER ETAL 3,237,393
ALARM CLOCK HOUSING
Filed Dec. 18, 1963 2 Sheets-Sheet 1
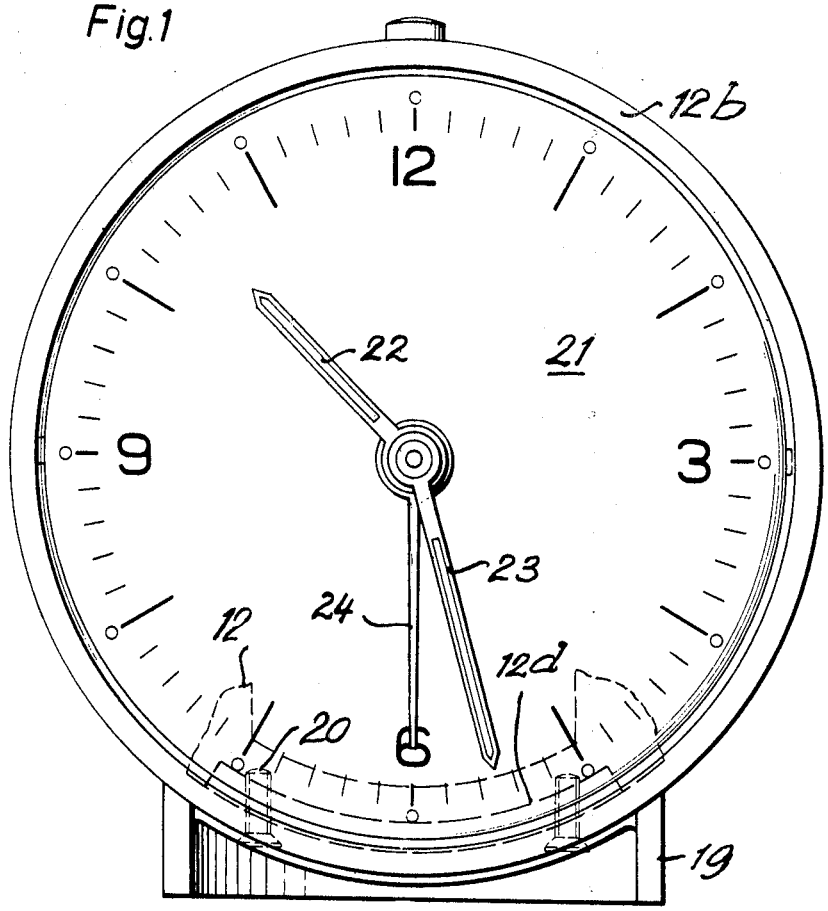
Fig.1
Fig.2
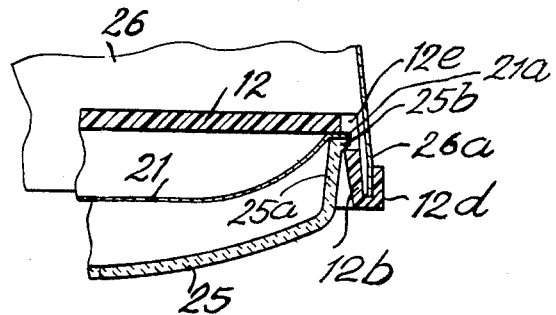
INVENTORS
A. Ziegler
R. Bauer
G. Stodt
BY
Watson, Cole, Grindle & Watson
ATTYS.

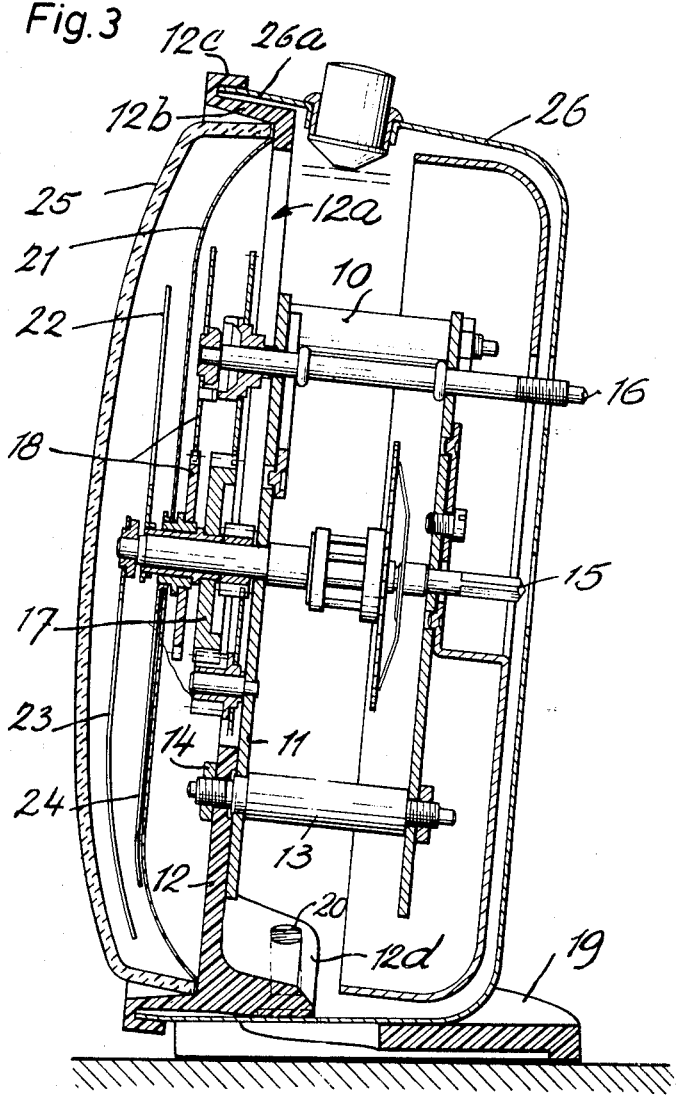

3,237,393
ALARM CLOCK HOUSING
Anton Ziegler and Rudolf Bauer, Schramberg, Wurttemberg, and Günther Stodt, Schramberg, Sulgen, Wurttemberg, Germany, assignors to Gebruder Junghans Aktiengesellschaft, Schramberg, Wurttemberg, Germany, a corporation of Germany
Filed Dec. 18, 1963, Ser. No. 331,406
Claims priority, application Germany, Dec. 21, 1962,
J 11,150
3 Claims. (Cl. 58—53)

The invention relates to alarm clocks with casing shell and movement inserted from the front. The object of the invention is to simplify the construction, manufacture and assembly of such clocks by employing plastic molded parts. This is attained according to the invention by constructing the movement carrier, glass mounting and connecting means for the base of the case as one-piece molding. In the preferred form of construction, the glass mounting projects out from the plane of the movement carrier plate a distance approximately equal to the height of the hand transmission gear and has at its extremity a peripheral fold open towards the rear into which the edge of the casing shell is pushed. Recesses are preferably provided in the glass mounting at the place where it joins the movement carrier plate for the engagement of corresponding latches formed on the edge of the dish-shaped clock glass also made from plastic material, these recesses being preferably situated at such a distance from the front surface of the movement carrier plate that the edge of the domed dial extending over the hand transmission gear can be clamped under the edge of the glass. In one embodiment of the invention, a segment-shaped reinforcement projecting into the movement compartment is formed at the bottom of the movement carrier plate in the vicinity of the glass mounting and the base bearing against the outer side of the casing shell is fixed on this reinforcement with the aid of screws.

Further features and advantages of the invention will become apparent from the following description of an embodiment illustrated by way of example in the accompanying drawings and characterized in the accompanying claims.

In the drawings,

FIG. 1 shows an alarm clock in front elevation,

FIG. 2 a detail in connection with the fixing of the clock glass and

FIG. 3 the alarm clock in vertical section viewed from the side.

The front plate 11 of the movement designated by 10 is connected with the movement carrier plate 12 by means of screws, whereby the frame pillars 13 pass through the movement carrier plate and screw nuts 14 hold together the movement carrier plate, back plate and frame pillars. The movement carrier plate 12 has an aperture 12a through which the alarm clock movement with the two hand arbors 15 and 16, the hand transmission gear 17 and the alarm setting mechanism 18 as well as the hands extend. The movement carrier plate has a peripheral glass mounting rim 12b in the form of a flange terminating in a fold 12c open towards the rear. A reinforcement 12d projecting into the movement compartment is formed at the bottom of the movement carrier plate 12 and the base 19 of the clock, which in the example illustrated is also made from plastic material, is fixed thereon by means of screws 20.

The hand transmission gear 17 and the alarm setting mechanism 18, the dial 21 and the hands 22, 23, 24 are covered in by the domed clock glass 25 made from transparent synthetic substance. The wide edge 25a of the glass 25 is provided at its extremity with projections 25b the object of which is to enable the glass to engage through the intermediary of these projections in the recesses 12e at the place where the glass mounting 12b joins the movement carrier plate 12. These projections 25b and the recesses 12e are also so arranged in relation to each other and to the front surface of the movement carrier plate 12 that the edge 21a of the dial 21 can be clamped under the edge of the glass. The dial 21 is of such diameter that its outer edge fits exactly in the glass mounting 12b.

The glass mounting 12b projects out of the plane of the movement carrier plate 12 a distance approximately corresponding to the height of the hand transmission gear and the alarm setting mechanism, that is, the front plane of its opening is at about the same height as the principal plane of the dial 21. The fold 12c opens towards the rear from the front edge of the glass mounting serves for receiving the edge 26a of the casing shell 26 which consists of a drawn cup-shaped sheet-metal part. The clock base 19 is attached to the casing shell 26 by means of screws 20, these screws being screwed into threaded bores in the reinforcement 12d on the movement carrier plate 12.

What is claimed is:

1. An alarm clock comprising a single and unitary carrier plate and circular mounting rim with a fold peripherally arranged around the rim, a base for the carrier plate with the latter extending from the base, a casing shell covering the back part of the clock and projecting into the peripheral fold in the rim, a clock work secured to the carrier plate, a dial for the front of the clock secured in the circular mounting rim, a transparent cover over the dial secured to the circular mounting rim, and a reinforcement for the plate provided and secured in the bottom of the base, said peripherally arranged fold around the rim being open toward the back of the clock to receive the peripheral edge of the casing shell therein.

2. An alarm clock according to claim 1, in which the reinforcement projects into a compartment in which the clockwork is secured and being integral with the base and the carrier plate.

3. An alarm clock according to claim 1, in which the rim is provided with recesses and the transparent cover is provided with a plurality of projections to engage in the recesses, and in which the dial has a plurality of edges to project into the recesses.

References Cited by the Examiner

UNITED STATES PATENTS

| 549,242 | 11/1895 | Lane | 58—54 |
| 2,789,412 | 4/1957 | Marble | 58—53 |
| 3,022,627 | 2/1962 | Junghans | 58—55 |

LEO SMILOW, *Primary Examiner.*

G. F. BAKER, *Examiner.*